United States Patent Office

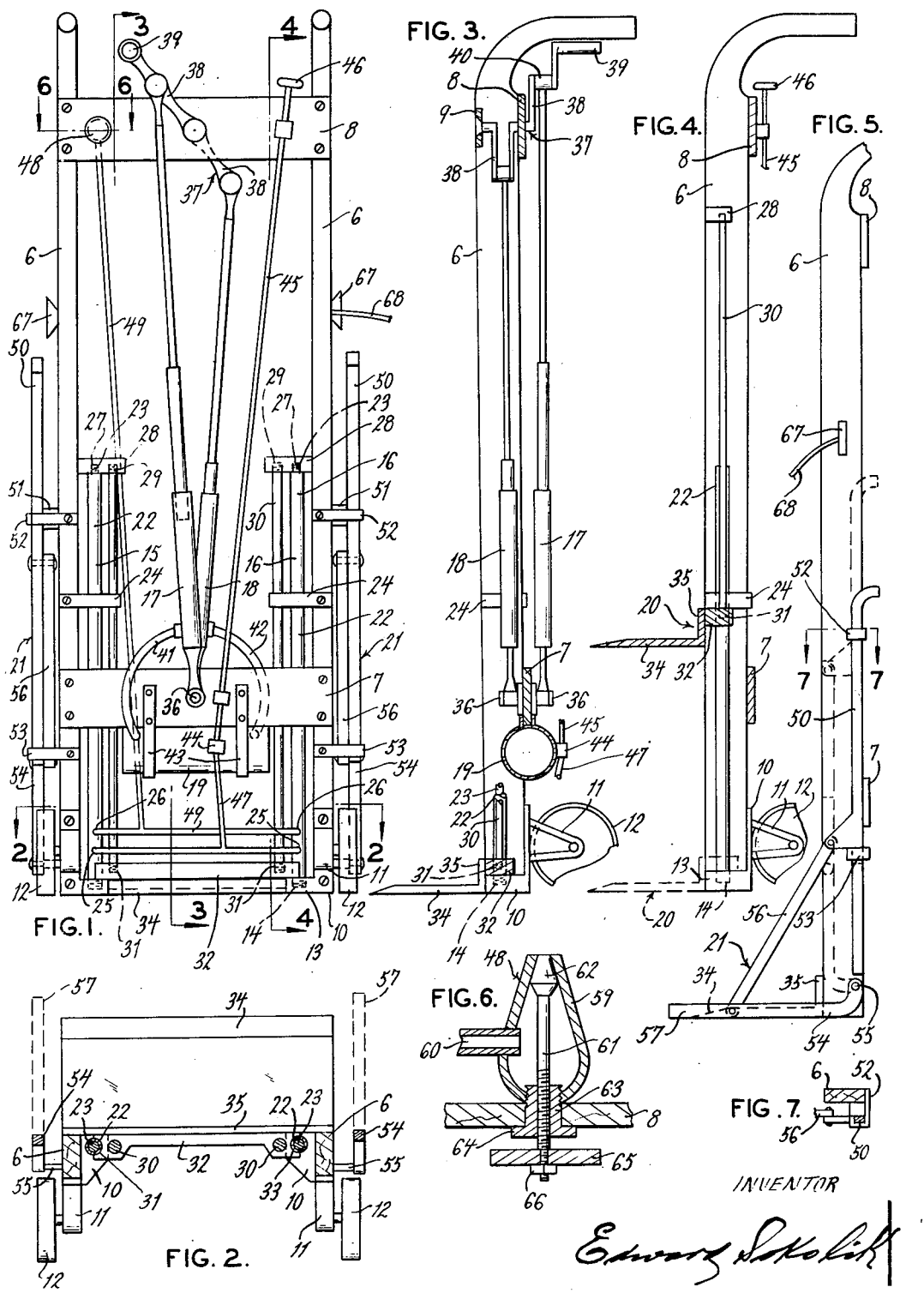

2,702,607
Patented Feb. 22, 1955

2,702,607

PNEUMATIC HAND TRUCK

Edward Sokolik, New Brighton, Minn.

Application August 9, 1952, Serial No. 303,561

2 Claims. (Cl. 187—9)

My present invention relates to improvements in pneumatic hand trucks and the principal object of the invention is to provide a hand truck whereby a man alone can wheel heavy commodity to a motor truck and the like and load up or unload and wheel the commodity from the truck.

Another object is to provide a pneumatic hand truck that is self stabilizing when the commodity is being elevated onto or lowered from the motor truck.

Still another object is to provide a hand truck with two pneumatic cylinders to avoid binding stresses in the telescoping of the pneumatic cylinders.

A further object is to provide a hand truck with two alternating compression air-pumps oscillating on pivoted bottom ends thereof when pumped, said pumping being done by hand cranking or by hand levering as desired.

Other objects and advantages of the invention will be apparent during the course of the following description.

In the accompanying drawings, forming a part of this application, and in which like numerals designate like parts throughout the same, Fig. 1 is a rear elevation of the hand truck.

Fig. 2 is a view on line 2—2 Fig. 1.

Fig. 3 is a view on line 3—3 Fig. 1, showing the pumping mechanism.

Fig. 4 is a view on line 4—4 Fig. 1, showing the elevating mechanism in its upper and lower positions.

Fig. 5 is an elevational side view of one handle of the truck showing the stabilizing mechanism on one side of the truck attached to said handle.

Fig. 6 is a longitudinal section of my air release valve on the dash board.

Fig. 7 is a cross section on line 7—7 Fig. 5, showing the holding clip and the upright bar of the stabilizing mechanism held by said clip.

In the drawings, wherein for the purpose of illustration, is shown a preferred embodiment of my invention, the numeral 6 designates the handles of the truck held in parallelly spaced alignment by the lower tie-member 7 and upper tie-member 8 both rigidly fastened to the rear edges of said handles. A tie-member 9 may optionally be employed and fastened counter-sunk in the front edges of the handles 6 opposite the dash board 8. Each handle is provided with a shoe 10, preferably cast and consisting of a bracket 11 secured to the rear edge of its respective handle and provided with a transport wheel 12, and of a heel extension 13 extending alongside the inner side of each handle and provided with a screw-threaded bore 14 extending from the top thereof downwardly.

The pneumatic apparatus disposed between the handles 6, is where the invention principally resides. This apparatus constitutes a combination of a pair of pneumatic cylinders 15 and 16; a pair of compression air-pumps 17 and 18 provided with a compression air tank 19; and carrying, elevating and lowering platform mechanism designated by 20 at the platform thereof; a pair of foldably retracting mechanisms for stabilizing the hand truck when elevating or lowering commodity may be employed. Each mechanism, indicated by the numeral 21, is secured to the outer side of each handle 6.

Each pneumatic cylinders 15 and 16 comprises a pair of telescoping tubes 22 and 23. They are of such relative length so that they are partly telescoped when a commodity has been elevated to the desired height such as the height of the rear end of a motor truck to be loaded. Each tube 22 has the lower end thereof screwed into the screw-threaded bore 14 and is further secured to the handle 6 by the clip 24. It is provided at its lower end with a combination air intake and air check device 25, and with an air outlet 26.

Each tube 23 is somewhat shorter and is provided at its lower end with an air leak proof head with which it telescopes in the tube 22 through its upper open end. The upper end of the tube 23 is screwed into the screw-threaded bore 27 in the short transverse tie-member 28, which is provided with another screw-threaded bore 29 adjacent the bore 27. This tie-member 28 also affords a stop for limiting the lowering of the telescoping tube 23, by seating itself on the end of the outer tube 22.

The elevating mechanism 20 includes a pair of elongated supports 30, each preferably a pipe having the top end thereof preferably screwed into the screw-threaded bore 29 and the bottom end preferably screwed into the screw-threaded bore 31 in the long tie-member 32 which maintains stability of the bottom ends of the depending supports 30 by means of its semi-circularly bifurcated ends 33 slideably engaging the tube 22. The stability of the top ends is maintained by the clips 24. This tie-member 32 preferably has the rear edge thereof recessed to allow by-passing the air tank 19. It affords a stop co-operating with stops 28 and it also affords a support for the platform 34 which is a plate having a right angled flange 35 secured to the tie-member 32. As a stop its bifurcated ends are seated on the heels 13 when down, and against the clips 24 when up.

The compression air-pumps 17 and 18 are illustrated, as arranged at right angle to the width of the truck with the bottom ends thereof pivotally mounted, one on each side at 36 of the transverse tie 7. When pumping these pumps 17 and 18 oscillate on the pivotal mounting. They are alternately acting and are provided with a combination hand operable lever-crank shaft 37, which has a pair of opposed cranks 38, each operating each pump 17 and 18 respectively, one on each side of the tie-member 8. The lever-crank shaft 37 is journaled in the tie-member 8 and optionally in the tie-member 9 for better stability. The operable end of the crank-shaft 37 is provided with a hand crank 39 connected to the journal 40 of the crank-shaft 37. This crank 39 is operable leverably or revolvably as desired.

Air conduits 41 and 42 lead from outlets in the lower ends of the pumps 17 and 18 to inlets in the air tank 19, or if a tank is not used, then directly to the combination air inlet and air check devices 25. This air tank 19, if used, is held by a pair of clips 43 secured to the tie-member 7, and is provided, preferably at the end, with an air outlet valve 44 which is operable by means of a rod 45 provided with a hand wheel 46 on the dash board 8. A bifurcated air conduit 47 leads from the valve 44 to each inlet 25 of each pneumatic cylinders 15 and 16.

Demountably secured to the dash board 8, is an air release valve 48 provided with a bifurcated air conduit 49 leading to each air outlet 26 of each pneumatic cylinders. This valve 48 is preferably of my design as illustrated, whereby the release of air is easily regulated as desired, and is adapted rigidly to hold said air conduit 49.

Each foldably retractable mechanism 21 for stabilizing the hand truck when elevating, includes three coacting bar-members: An elongated member 50 extending alongside each handle 6 shimmed therefrom by rubber or spring shims 51 and secured thereto by clips 52 and 53. The shims 51 hold frictionally each device 21 in its folded or unfolded position. The folding or unfolding is accomplished by shoving the elongated member 50 up or down; a footing member 54 secured to each handle 6 at the outer base thereof by a pivot 55, and a bracing member 56 pivotally connecting the member 50 to the footing member 54 preferably some distance from the end 57 of said footing 54. The footing member is of right-angular shape at the pivoted end to facilitate unfolding when bar 50 is pushed down.

Each bracing member 56 is somewhat longer than the footing member 54 and is, as illustrated, pivoted preferably on the inner sides of the members 50 and 54 in a manner to allow clearance of all pivots between the members 50, 54 and 56. It will also be noted that the bracing bar 56 is disposed, when in its upper or folded position, in front of the bar 50, thereby allowing the end-portion 57 of the footing bar 54 to lap, when folded, the lower end-portion of the bar 50 lapping said lower end-portion in the front thereof, spaced therefrom by means of the pivot carrying bracket on the bar 50. This bracket pivotally connecting the bar 50 and bar 56, is projected forwardly substantially as much as the bar 54 is by its rightangular end-portion pivotally secured by pivot 55 to the handle 6.

Illustrated in Fig. 6 is a release valve 48 of my design. It includes a body 59, an air inlet shank 60, a stem 61 provided with a conical valve 62, a screw bushing 63 which is screwed into the body 59 and into which the stem 61 is screwed. This bushing 63 has an annular flange 64 which clamps the dash board 8 to the body 59. The end of the stem 61 is reduced and provided with a hand wheel 65 locked by the nut 66.

Each handle 6 on the outer side, has a cleat 67 provided with cordage 68 whereby boxed or barrelled commodity may be secured to the handles 6 when being elevated or lowered.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim as my invention:

1. A hand truck comprising, a frame including upstanding handles, wheels mounted upon the handles near their lower ends, a tank mounted upon the frame between the handles, a pair of alternately acting compression pumps arranged between the handles and extending longitudinally thereof and pivotally mounted near their lower ends upon the frame, a lever pivotally mounted between its ends upon the frame and arranged between the handles and having its ends pivotally connected with said pumps, conduits connecting said pumps with the tank, elongated tubes arranged upon opposite sides of said pumps and extending longitudinally of the handles and disposed inwardly of and near the handles and secured to the handles, a transverse tie-member arranged between said tubes and having recesses at its ends to slideably receive the tubes, said tie-member having a starting position adjacent to the lower ends of the handles, a platform mounted upon the transverse tie-member to be moved thereby, plunger elements to reciprocate within the tubes and extending outwardly beyond the upper ends of the tubes, connecting rods disposed exteriorly of and near the tubes and connected with the upper ends of said plunger elements and having their lower ends secured to the transverse tie-member, valve controlled means to regulate the feeding of fluid pressure from the tank to the lower ends of the tubes, and valve controlled means for regulating the discharge of pressure from the tubes.

2. A hand truck comprising, a frame including upstanding handles, wheels mounted upon the handles near their lower ends and upon the rear side of the handles, a tank mounted upon the frame between the handles, a pair of alternately acting compression pumps arranged between the handles and extending longitudinally of the handles and pivotally mounted near their lower ends upon the frame, a lever pivotally mounted between its ends upon the frame and arranged between the handles and having its ends pivotally connected with said pumps, conduits connecting said pumps with the tank, elongated tubes arranged upon opposite sides of said pumps and extending longitudinally of the handles and disposed inwardly of and near the handles and secured to the handles, a transverse tie-member arranged between said tubes and having their ends slideably engaging the tubes to be guided by the tubes, said tie-member having a starting position adjacent to the lower ends of the handles, a platform mounted upon the transverse tie-member to be moved thereby, plunger elements to reciprocate within the tubes and extending outwardly beyond the upper ends of the tubes, connecting rods disposed exteriorly of and near the tubes and connected with the upper ends of said plunger elements and having their lower ends secured to the transverse tie-member, valve controlled means to regulate the feeding of fluid pressure from the tank to the lower ends of the tubes, valve controlled means to regulate the discharge of fluid pressure from the lower ends of the tubes, footing members pivotally mounted upon the handles near their lower ends and disposed upon the forward sides of the wheels, and adjustable means to swing the footing members to an open position at substantially right angles to the handles and to hold the footing members in such open position, the footing members serving to prevent the forward tilting of the frame when in the substantially vertical position.

References Cited in the file of this patent

UNITED STATES PATENTS

| | | |
|---|---|---|
| 653,826 | Soule et al. | July 17, 1900 |
| 2,456,320 | Repke | Dec. 14, 1948 |
| 2,482,211 | Reichardt | Sept. 20, 1949 |
| 2,493,824 | Noros | Jan. 10, 1950 |
| 2,514,825 | Zenko | July 11, 1950 |
| 2,560,131 | Sasgen et al. | July 10, 1951 |
| 2,598,489 | Bayer et al. | May 27, 1952 |